United States Patent [19]

Veit et al.

[11] Patent Number: 5,142,159

[45] Date of Patent: Aug. 25, 1992

[54] METHOD AND APPARATUS FOR VOLUME OR SIZE DETECTION OF A YARN PACKAGE AND FOR DERIVING CONFINED CONTROL PROCESSES THEREFROM

[75] Inventors: Norbert Veit, Monchen-Gladbach; Heribert Kargel, Viersen, both of Fed. Rep. of Germany

[73] Assignee: W. Schlafhorst AG & Co., Monchen-Gladbach, Fed. Rep. of Germany

[21] Appl. No.: 632,961

[22] Filed: Dec. 21, 1990

[30] Foreign Application Priority Data

Dec. 21, 1989 [DE] Fed. Rep. of Germany ....... 3942304

[51] Int. Cl.⁵ .................. G01N 21/86; G01B 11/28; B07C 5/04
[52] U.S. Cl. ................. 250/560; 250/223 R; 356/380; 209/586
[58] Field of Search .............. 250/223 R, 560, 548; 356/380, 379, 386, 429, 238; 209/586; 139/452, 273 A; 364/564, 565

[56] References Cited

U.S. PATENT DOCUMENTS

| | | | |
|---|---|---|---|
| 3,777,168 | 12/1973 | Sansone | 356/238 |
| 4,417,817 | 11/1983 | Bohme et al. | 356/380 |
| 4,687,107 | 8/1987 | Brown et al. | 209/586 |
| 4,693,607 | 9/1987 | Conway | 209/586 |
| 4,735,323 | 4/1988 | Okada et al. | 209/586 |
| 4,871,910 | 10/1989 | Ueno et al. | 356/386 |
| 4,914,307 | 4/1990 | Kanev | 250/560 |
| 4,977,331 | 12/1990 | Konig et al. | 250/560 |

FOREIGN PATENT DOCUMENTS 252592 12/1987 German Democratic Rep. .
265435 3/1989 German Democratic Rep. .
668637 1/1989 Switzerland .

Primary Examiner—David C. Nelms
Assistant Examiner—Michael Messinger
Attorney, Agent, or Firm—Herbert L. Lerner; Laurence A. Greenberg

[57] ABSTRACT

The method and apparatus optically scan the size of a yarn package of a spinning bobbin with a plurality of light transmitters and light receivers and derive defined control processes in accordance with the ascertained size. Bobbins with yarn packages are moved in a given direction of motion at a predetermined speed between a plurality of paired and mutually opposite light transmitters and light receivers disposed one above the other with respect to the given direction of motion for placing at least some of the light receivers into a shadow. At least one of the light transmitters and light receivers are switched on and off in cycles at a predetermined rhythm, order and duration. A signal is delivered to a computer from each of the light receivers placed into a shadow in each cycle by the bobbin. The volume of the applicable bobbin is calculated with the computer from a given time required for scanning one bobbin and from the signals from the shadowed light receivers delivered during the given time. The volume of the tube of the bobbin is subtracted from the volume of the bobbin for determining the volume of the yarn package. Defined control processes are derived and the bobbins are assigned to at least one of specific work stations and specific method steps, as a function of the volume of the yarn package.

15 Claims, 7 Drawing Sheets

METHOD AND APPARATUS FOR VOLUME OR SIZE DETECTION OF A YARN PACKAGE AND FOR DERIVING CONFINED CONTROL PROCESSES THEREFROM

The invention relates to a method and apparatus for optically scanning the size of a yarn package of a spinning bobbin having a plurality of light transmitters and light receivers and for deriving defined control processes in accordance with the ascertained size.

In order to process spinning bobbins (for instance on bobbin winding machines), it is helpful to know the size of the yarn package on the bobbins. The size of the yarn package may be a criterion for determining whether or not it is still worthwhile to unwind a bobbin on a bobbin winder and if so what winding speed and yarn tension should be used at the particular winding station. Below a certain yarn quantity, better winding results are obtained if the winding speed is dropped below the intended winding speed for a full bobbin.

A method and an apparatus are known from German Published, Non-Prosecuted Application DE-OS 37 34 395 for making the yarn tension more uniform when a cop is rewound onto a cross-wound bobbin using a winder apparatus. A control apparatus of a drive motor driving the cross-wound bobbin or cheese has a winding speed control program. The starting speed is dependent on the quantity of yarn on the spinning bobbin to be rewound. The above-mentioned patent application mentions an opto-electric measuring method operating according to the shadow principle, with the aid of which the size of the cop profile can be ascertained. However, the way in which that opto-electric apparatus is constructed and the way in which the size of the yarn package is determined, cannot be learned from the above-mentioned patent application.

It is accordingly an object of the invention to provide a method and apparatus for qualitative and quantitative detection of a yarn package and for deriving confined control processes therefrom, which overcome the hereinafore-mentioned disadvantages of the heretofore-known methods and devices of this general type and with the aid of which the size of a yarn package of a spinning bobbin can be detected simply and sufficiently accurately enough that defined control processes can be derived from the ascertained size.

With the foregoing and other objects in view there is provided, in accordance with the invention, a method for optically scanning the size of a yarn package of a spinning bobbin with a plurality of light transmitters and light receivers and for deriving defined control processes in accordance with the ascertained size, which comprises moving bobbins with yarn packages in a given direction of motion at a predetermined speed between a plurality of paired and mutually opposite light transmitters and light receivers disposed one above the other with respect to the given direction of motion for placing at least some of the light receivers into a shadow; switching the light transmitters and/or light receivers on and off in cycles at a predetermined rhythm, order and duration; delivering a signal to a computer from each of the light receivers placed into a shadow in each cycle by the bobbin; calculating the volume of the applicable bobbin with the computer from a given time required for scanning one bobbin and from the signals from the shadowed light receivers delivered during the given time; subtracting the volume of the tube of the bobbin from the volume of the bobbin for determining the volume of the yarn package; and deriving defined control processes and assigning the bobbins to specific work stations and/or specific method steps, as a function of the volume of the yarn package.

In accordance with another mode of the invention, there is provided a method which comprises scanning the bobbins line-by-line.

In accordance with a further mode of the invention, there is provided a method which comprises subtracting the predetermined volume of a tube from the ascertained volume of the bobbin, for ascertaining the volume of the yarn package.

In accordance with an added mode of the invention, there is provided a method which comprises ascertaining the actual dimensions of the tube of the bobbin from the number of light receivers shadowed by the top end and the number of light receivers shadowed by the bottom end of the tube of the bobbin.

In accordance with an additional mode of the invention, there is provided a method which comprises specifying the volume of the yarn package and the dimensions of the tube to the computer as reference values based on a fully wound, defect-free bobbin of one yarn batch, and comparing the volumes of the yarn packages of the bobbins and the dimensions of the tubes with the reference values.

In accordance with yet another mode of the invention, there is provided a method which comprises sorting the bobbins in accordance with various yarn batches from the ascertained volumes of the yarn packages and the dimensions of the tubes.

In accordance with yet a further mode of the invention, there is provided a method which comprises specifying an unwinding speed at an intended winding station of a bobbin winding machine from the ascertained volumes of the yarn packages of the bobbins.

In accordance with yet an added mode of the invention, there is provided a method which comprises specifying a yarn tension at an intended winding station of a bobbin winding machine from the ascertained volumes of the yarn packages of the bobbins.

It is not possible to determine the size of a yarn package if, for instance, only two opto-electric sensors are used. If one sensor measures only the thickness of the base of the bobbin tube and the other measures the diameter of the yarn package, then only the position of the yarn package and a diameter at the measuring station are determined. Such information is inadequate for qualitative and quantitative detection of a yarn package.

If a bobbin is illuminated by a single light source and its shadow is detected with the aid of a plurality of sensors, the accuracy of the detection of the shadow depends on the number of sensors scanning the shadow and on the precise projection of the shadow. When using a single light source, there is the intrinsic danger of distortion of the shadow, making the finding of the actual size of the yarn package too inaccurate. Furthermore, for such a measuring method the bobbin must be stopped at the measuring station, which interrupts the flow of bobbins in the system.

The method according to the invention avoids the problems and opportunities for mistakes that are discussed above by providing that the bobbin is moved at a predeterminable speed between one row at a time of light transmitters and light receivers that are disposed opposite one another in pairs, with the rows preferably being at right angles to the direction of motion, and the light transmitters and light receivers being switched on and off at a predetermined rhythm in a predetermined order for a predetermined duration. The distance that the bobbin has traveled during the scanning procedure can be ascertained from the predetermined cycle time and the transport speed for the bobbin that is measured.

During the cycle period, the light transmitters and the light receivers that are disposed opposite them are switched on simultaneously in succession and are immediately switched off again. If any part of either the yarn package or the tube of the bobbin protrudes into the path of the beam, the beam is broken and the light signal is not received by the light receiver in the shadow. Once all of the light trans mitters and light receivers within this cycle have been switched on and off, a new cycle begins again with the first light transmitter and light receiver being switched on again, after switching off the last light transmitter, which is the uppermost or lowermost, depending upon the travel direction in which the switching on begins. During each cycle, the bobbin moves a certain distance forward because of the continuous transport speed of the bobbin. A surface area that is thrown into a shadow by the bobbin can be ascertained from the number of light receivers in the shadow per cycle, and from the path traveled in the cycle time. As is explained below, the corresponding volume can be calculated with the aid of this area.

Switching the light transmitters and light receivers on successively during a cycle is intended to prevent the emission of a light signal by a light transmitter from influencing a light receiver for which this signal is not intended. However, if the focusing of the light beam can be made so fine that there is no impairment of the adjacent light receivers, then it is also possible to switch all of the light transmitters and light receivers on and off simultaneously during a cycle. This increases the cycle rate and thus the accuracy of the measuring method.

The light receivers that are in a shadow transmit signals to a computer. The computer ascertains the volume of the bobbin from the signals sent to it during the scanning duration of a bobbin. In order to enable a determination of the volume of a yarn package, either the computer must be supplied beforehand with the volume of a bobbin tube, so that it can subtract that volume from the ascertained volume of a bobbin, or else the computer recalculates the volume of the bobbin tube anew for each bobbin in a separate measuring procedure, from the signals arriving at the computer.

The bobbins may be moved past the light transmitters and light receivers horizontally or vertically. As a result, the scanning method is advantageously usable with any transport system known in the prior art. With horizontal passage past the transmitters and receivers, the number of light receivers in a shadow per cycle is at the same time a measure of the diameter of the bobbin at the measuring station. The cross-sectional area of the bobbin can easily be calculated from this. The distance traveled during this cycle time is equivalent to the height of a cylinder segment of the bobbin. The volume of a cylinder which can be calculated from the cross-sectional area and the height, represents a portion of the volume of the bobbin.

With bobbins that are disposed for vertical passage past light transmitters and light receivers that are placed one above the other, line-by-line scanning of the bobbins is advantageous. While the bobbin that is vertically disposed is moved past the light transmitters and light receivers that are disposed one above the other, the scanning lines are horizontal. The number of lines in which shadows have appeared, and the number of shadows that have appeared per line and cycle are then stored in memory during scanning. The length of a line may be ascertained from the number of light receivers in a shadow, by matching the number of cycles per scanning in this line, the cycle period, and the transport speed of the bobbin. The length of a line is equivalent to a diameter of the bobbin. The cross-sectional area at this station on the bobbin can be calculated with the diameter. The width of one line depends on the distance from the light receiver and is equivalent to part of the total height of the bobbin. The computer calculates a cylinder volume which is equivalent to a partial volume of the bobbin, from the height and the cross-sectional area. The number of lines with light receivers in a shadow determine the number of cylinder volumes to be added together to give the total volume of the bobbin.

The dimensions of the tube of a bobbin can be reascertained for each bobbin. To this end, the shadows cast by the top and bottom region of the tube are evaluated separately. When the bobbin is traveling horizontally, the bottom or top end of the bobbin reaches the measuring station first. The number of light receivers in a shadow at the beginning of scanning is a measure of the diameter of the bottom or top end of the tube, as applicable. When the bobbin leaves the measuring station, the light receivers are first shaded by the top or bottom of the tube, again as applicable. Thus the number of the last light receivers in a shadow is a measure of the diameter of the top or bottom end of the tube. The tube geometry and therefore the volume of the tube can be determined from the diameter of the top end and the diameter of the bottom end, in combination with the distance traveled by the tube during the scanning.

When the bobbins are fed in a vertical configuration past light transmitters and light receivers that are disposed one above the other, the signals of the uppermost and lowermost light receivers in a shadow are used for calculating the tube geometry. The number of shadows during the scanning time, the distance traveled during the feeding of the bobbin past the transmitters and receivers, and the number of lines of light receivers in a shadow are factors on which the determination of the tube geometry and therefore of the tube volume of the bobbin are based.

The tube volume that can be ascertained or predetermined by the above two variant methods is subtracted from the total volume of the bobbin ascertained for the computer, so that the actual volume of the yarn package is obtained. If the computer is given the volume of the yarn package and the dimension of the tube of a fully wound, defect-free bobbin as a reference value, then the actually ascertained volume of a yarn package of a bobbin and the dimensions of its tube can be compared with these reference values. Control processes for assigning the bobbins to specific work stations and/or specific method steps can advantageously be carried out from a comparison. Each batch of yarn has a characteristic size of its yarn package. In order to distinguish yarn batches, different tubes may also be used. Bobbins of different yarn batches can be scanned by the method according to the invention from these distinguishing criteria. Sorting in accordance with different yarn batches can be carried out from the volumes of the yarn packages that are ascertained and/or from the dimension of the tubes of the bobbins being scanned.

Another advantage of the method of the invention is that defined control processes can be derived from the ascertained volumes of the yarn packages of the bobbins. As a result, the optimal unwinding speed at a given winding station of a bobbin winder can be specified beforehand. Fully wound bobbins are recognized and are unwound at the maximum possible winding speed. In contrast, bobbins having a remnant yarn package can be unwound at a substantially lower winding speed, in order to avoid interruptions and increased yarn breakage. The computer accordingly transmits a signal from the size of the yarn package ascertained by it to the winding station of the bobbin winding machine intended for the bobbin, and the winding speed is adjusted by means of this signal.

The yarn tension can also be specified at the applicable winding station of a bobbin winder from the volumes of the yarn packages of the winding stations being ascertained. Since the volumes of the yarn packages of a bobbin have an influence on the winding speed, the next method step is an ideal supplement to this provision, because the yarn tension is dependent on the winding speed. Thus, the adjustment of the yarn tensioner can be performed simultaneously by the computer from the ascertained volumes of the yarn packages.

With the aid of the scanning method according to the invention, not only the volume of a yarn package on a bobbin but also its position on the tube can be ascertained. If the bobbins are moved horizontally, the position of the yarn package on the tube can be ascertained by measuring the elapsed time, or the number of cycles, since additional shading of light receivers besides the shading by the tube has occurred. If the bobbin is moved vertically, the position of the lines at which an additional shading caused by the yarn package in addition to the shading by the tube takes place, is definitive. Once the position of the yarn package on the tube is ascertained, sorting can also be carried out on the basis of that criterion, if suitable limit values are specified to the computer.

With the objects of the invention in view, there is also provided an apparatus for optically scanning the size of a yarn package of a bobbin and for performing defined control processes derived according to the ascertained size, comprising a transport apparatus with a conveyor belt on which bobbins are transported at a predetermined speed, the transport apparatus having a drive for the conveyor belt, and the transport apparatus having a plurality of light transmitters and light receivers disposed one above the other and opposite one another in pairs on the right and left of the conveyor belt; a timer connected to at least one of the light transmitters and light receivers for controlling the switching of the light transmitters and/or light receivers on and off in a predetermined order and for a predetermined duration; a signal line connected to the timer, a computer connected through the signal line to the timer; other signal lines connected between the light receivers and the computer; a further signal line through which the computer communicates with the drive of the transport apparatus for specifying a transport speed; at least one means for performing a defined control process and for assigning the bobbins to certain work stations and/or method steps, and an additional signal line through which the computer communicates with the at least one performing and assigning means.

In accordance with another feature of the invention, the at least one performing and assigning means is a sorting apparatus for sorting the bobbins as a function of a specified volume of a yarn package.

In accordance with a further feature of the invention, the at least one performing and assigning means is a sorting apparatus for sorting the bobbins on the basis of a particular yarn batch to which the bobbins belong.

In accordance with an added feature of the invention, the at least one performing and assigning means are shunts for assigning the bobbins to certain winding stations of a bobbin winding machine.

In accordance with an additional feature of the invention, the at least one performing and assigning means is a yarn tensioner for controlling yarn tension.

In accordance with a concomitant feature of the invention, the at least one performing and assigning means is a controllable drive of a winding drum at a winding station.

Other features which are considered as characteristic for the invention are set forth in the appended claims.

Although the invention is illustrated and described herein as embodied in a method and apparatus for qualtative and quantitative detection of a yarn package and for deriving confined control processes therefrom, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

Figure 1:
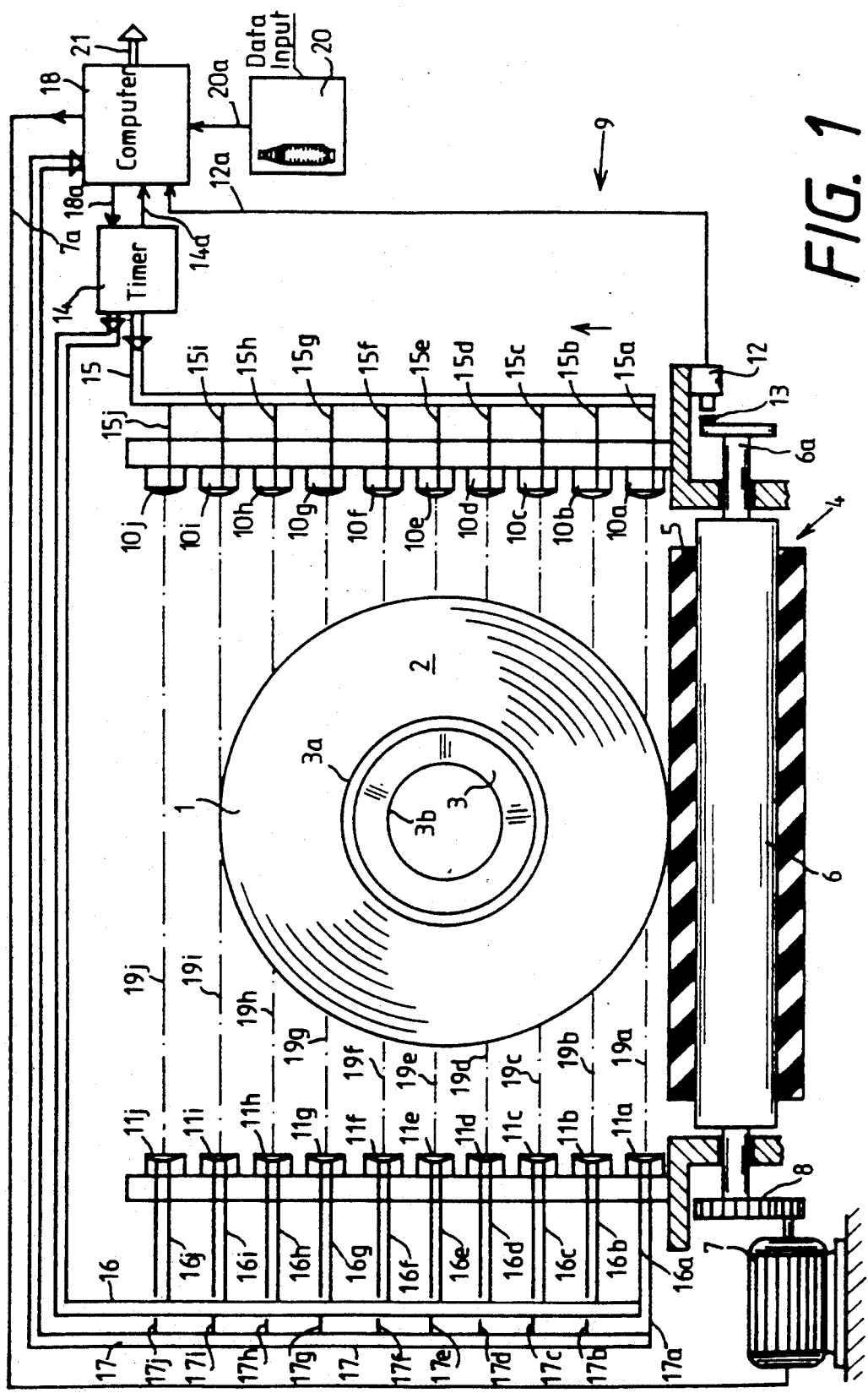
FIG. 1 is a fragmentary, diagrammatic, partly sectional and schematic view of an apparatus for optical scanning of a bobbin which is transported while lying horizontally.

Referring now to the Figures of the drawings in detail and first, particularly, to FIG. 1 thereof, there is seen a winding or spinning bobbin 1 including a yarn package 2 that is wound on a tube or sleeve 3 and is transported to a non-illustrated bobbin winding machine by means of a transport apparatus 4. Only those features necessary for a comprehension of the invention are shown in the drawing. The transport apparatus 4 includes a conveyor belt 5, on which the bobbin 1 rests horizontally. The conveyor belt 5 is wrapped around a drive roller 6, which is driven by a motor 7 through a gear 8.

Optical scanning of the bobbin takes place at a measuring station 9 with a plurality of light transmitters 10a-10j, which are disposed vertically one above the other and are located beside the conveyor belt. Light receivers 11a-11j are each located at the same height and at the opposite side of the conveyor belt from a respective one of the light transmitters. The light receivers 11a-11j are likewise disposed vertically in a row, one above the other. The light transmitters can be infrared light transmitters, with infrared light sensors opposite each of them. Light transmitters that aim fine concentrated laser beams on a light receiver would also be conceivable.

The conveyor belt 5 travels at a constant predetermined speed and is monitored by a sensor 12 that scans a marking 13 which rotates with the drive roller 6. Accordingly, the bobbin 1 is moved past the measuring station 9 at a constant speed. The drive of the conveyor belt can also be performed with a stepping motor. In that case scanning of the drive roller is unnecessary. Each step or increment lasts a predetermined time during which the conveyor belt travels a predetermined distance.

The light transmitters 10a-10j are switched on and then off again in succession, each for a fixed period of time. In the same way, the light receivers facing them are each switched on and off, beginning at 11a, for the same period of time as the oppositely disposed light transmitter. One complete sequence of switching the respective light transmitters and light receivers on and off, from 10a and 11a through 10j and 11j, is called a cycle. One cycle, with a full sequence of switching the light transmitters and receivers on and off, follows the next continuously. The cycle time is known, as is the transport speed of the conveyor belt. The light transmitters and light receivers are also disposed at a known distance from one another. The diameter that is scanned during one cycle can be ascertained from the number of light receivers in the shadow of the bobbin, and from their distance from one another. During one cycle, the bobbin moves forward by a defined distance, because of the constant transport speed. This is equivalent to a predetermined segment of the length of the bobbin. A volume per cycle can be calculated from the diameter and length of the bobbin ascertained per cycle. The scanning time of one bobbin includes a predetermined number of cycles. When added together, the volumes calculated per cycle are approximately the volume of the bobbin, as already described in the introductory section above. The accuracy of the volume calculation depends substantially on the cycle rate, in other words on the number of cycles in the time during which the bobbin is moved past the measuring station.

The apparatus of FIG. 1 operates as follows:

The bobbin 1 is moved toward the observer with a tube bottom 3a of the tube 3 leading. The light transmitters 10a-10j and the light receivers 11a-11j are already switched on and off after a predetermined, specific cycle. The cycle is specified in each case by a timer 14. Each of the light transmitters 10a-10j is connected to the timer 14 through a respective signal line 15a-15j. The combined signal lines are identified by reference numeral 15. The light receivers 11a-11j are also connected to the timer 14 through respective signal lines 16a-16j thereof. Reference numeral 16 indicates combined signal lines connected to the timer. As soon as the tube bottom 3a breaks one of several beams 19a-19j from the applicable light transmitters 10a-10j, the fact that the simultaneously switched-on light receiver is in a shadow is recorded on the opposite side. This signal is reported to a computer 18 through another corresponding signal line 17a-17j of the light receiver that is in a shadow. The signal lines 17a-17j of the light receivers 11a-11j that extend to the computer 18, are joined together and identified by reference numeral 17. By digitizing the light signals and encoding the light transmitters and light receivers, it is also possible to avoid using expensive individual signal lines.

The timer 14 and the computer 18 are connected with one another in alternation through signal lines 14a and 18a. The computer specifies the cycle rate to the timer and in return receives the report of a proper cycle rate from the timer. The computer also controls the rpm of the drive motor 7 of the transport apparatus 4, over a further signal line 7a. The computer therefore specifies the transport speed. Monitoring of the transport speed is effected through rpm monitoring of the drive roller 6 of the transport apparatus 4. This is accomplished by the fact that the revolution of the marking 13 on a shaft 6a of the drive roller 6 is monitored by the sensor 12. The signals of the sensor 12 are imparted to the computer over a signal line 12a.

As the bobbin 1 is being moved past the measuring station, an alternating number of light receivers is placed into a shadow. The number of light receivers in the shadow increases as soon as a yarn package breaks the beams 19a-19j of the light transmitters 10a-10j. With a decreasing yarn package, the number of light receivers in shadow drops as well. Finally, only a tube top 3b of the tube 3 places a certain number of light receivers into a shadow. Once there are no longer any light receivers in the shadow, the scanning procedure for one bobbin is ended. A new scanning procedure can then begin. As already explained above, the computer ascertains the volume of the bobbin from the signals supplied to it during the scanning procedure. Since the computer receives the signals of the diameter of the tube bottom at the beginning of the scanning procedure it receives the signals of the diameter of the tube top and at the end of the scanning procedure, and since it can ascertain the length of the tube from the transport speed and from the time elapsed during the scanning procedure, it is also possible to ascertain the volume of the tube. The computer subtracts this tube volume from the total bobbin volume and thus obtains the volume of the yarn package.

The computer 18 is preceded by a data input 20, which is connected to the computer over a signal line 20a. The data for a precisely wound ideal bobbin are entered into the data input 20. This ideal bobbin is symbolized by the bobbin shown in the box in the drawing. The data entry can be carried out manually, for instance, by typing-in the dimensions. However, it is also possible for an ideal bobbin to be scanned at the measuring station and for the measured values thus obtained to be input through the data entry. The volumes calculated can then be directly stored in memory as reference values. With the specification of the tube dimensions and the dimensions of an ideal bobbin, the computer is in a position to ascertain the volume of an ideal yarn package. After each scanning procedure of a bobbin, the computer accordingly first ascertains the volume of the yarn package of the bobbin being scanned and compares this volume with the volume of the ideal bobbin.

A selection among the bobbins is made from this comparison. It is also possible to use the data input to specify a tolerance range for a certain selection criterion, within which the yarn package volume of bobbins can vary.

The computer communicates over an additional signal line 21 with means for assigning the bobbins to specific work stations and/or method steps. These stations and method steps will be described below in conjunction with the ensuing drawings.

Figure 2:
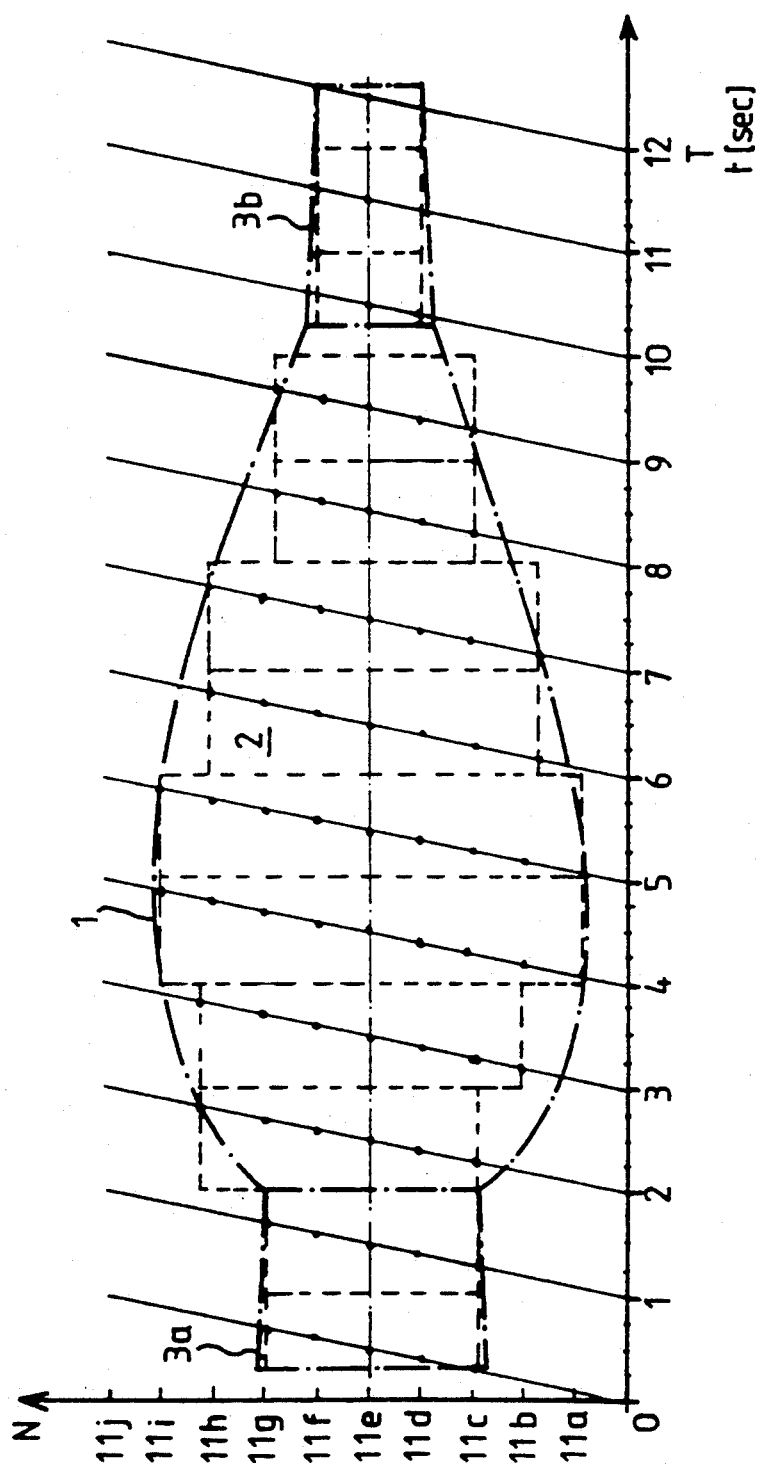
FIG. 2 is a diagram on which light receivers that are in shadow are plotted per cycle and against time, as an explanation of the determination of the yarn volume.

The ascertainment of the volume of the bobbin by the computer will be described in further detail below in conjunction with FIG. 2.

The drawing shows a coordinate system, with the time and the number of cycles of a scanning procedure, in this case 12, being plotted on the abscissa. Each cycle lasts a predetermined, fixed period of time. The light receivers 11a–11j are plotted on the ordinate. The particular light receivers that are in a shadow during a cycle are identified in the coordinate system with a dot. At a time 0, the first cycle begins. The light transmitters 10a–10j, and the light receivers 11a–11j opposite them, are each switched on simultaneously, in succession. The bobbin 1 transported to the measuring station 9 with the tube bottom 3a leading first breaks the beam 19c of the light transmitter 10c. This casts the light receiver 11c into a shadow. This light receiver sends a signal over the signal line 17c to the computer 18. The light transmitter 10c is switched off, and the light transmitter 10d is switched on. The tube bottom, which is advancing onward, casts a shadow on the light receiver 11d, which thereupon likewise reports this to the computer 18, over its signal line 17d. The shading extends as far as the light receiver 11g. The next subsequent light receivers 11h–11j are not in shadow during the first cycle. After the first cycle, numbered "1", all of the light transmitters and light receivers have been switched on and off in a constant time sequence. A shading of the light receivers 11c–11g therefore occurs. The cycle time amounts to a predetermined, known number of time units, for instance one-tenth of a second. Since the computer simultaneously ascertains the transport speed through the sensor 12, it can calculate the distance traveled by the bobbin from the elapsed time. In the present instance, this distance traveled is equivalent to a predetermined portion of the length of the bobbin. The number of light receivers in shadow per cycle makes it possible to ascertain the diameter of the bobbin. From these two ascertained data, a rectangle is outlined in the diagram, and the computer calculates a portion of the volume of the bobbin from it. After the first cycle, this is the part of the tube that has moved past the measuring station during the first cycle. Once the yarn package begins to move past the measuring station, the diameter of the yarn package is ascertained during a cycle. A further portion of the volume of the bobbin is thus calculated from each cycle to the next.

Accordingly, the outline of the bobbin is first represented by the rectangles drawn in dashed lines in the diagram. If the outermost sensors that are in shadow are placed next to one another, the result is an approximate image of the bobbin. For the sake of simplicity, the diagram is very generalized. If the cycle rate is substantially faster, cylinder portions that are scanned become flatter and flatter, so that they assume the shape of a disk. In the final analysis, the thinness of these disks depends on the possible resolution capacity of the apparatus and on the cycle period. The distance between the light transmitters and the light receivers also affects the accuracy of the measurement. The closer the light transmitters and light receivers are to one another, the finer is the graduation in diameter.

There is no yarn package on the tube top 3b of the tube. For this reason, the applicable diameter of the tube is ascertained during cycles 10, 11 and 12. The number of cycles indicates the time required for scanning the bobbin. The length of the tube can be determined from the time that has elapsed from the first shading of the light receiver 11c through the last shading of the light receiver 11f and from the distance traveled by the bobbin during this period of time. The tube diameter can be determined from the number of light receivers that are in a shadow during the first and last cycle. The tube volume calculated from this is then subtracted from the total volume of the bobbin. The result is the actual volume of the yarn package.

Figure 3:
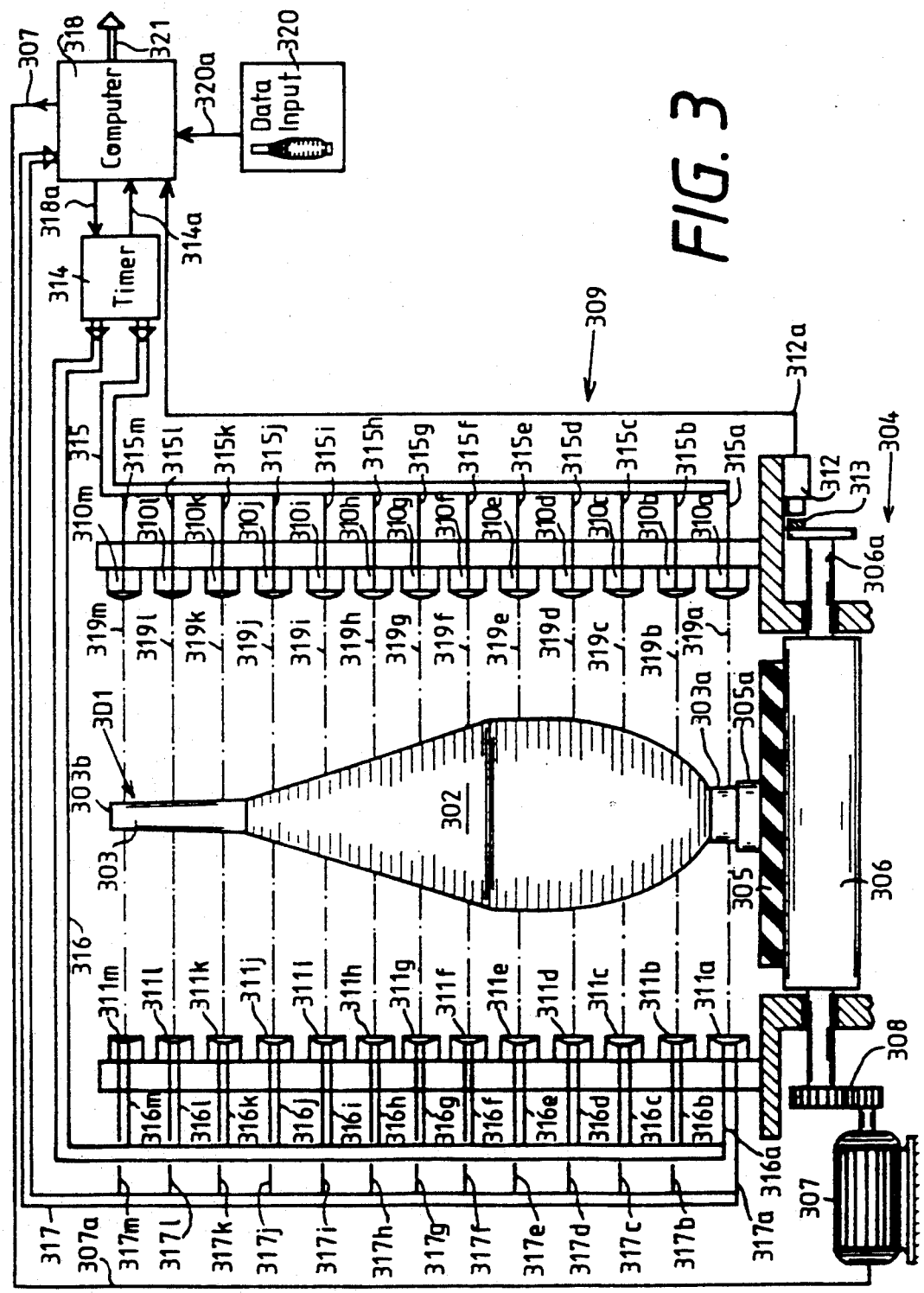
FIG. 3 is a view similar to FIG. 1 of an apparatus for optical scanning of a bobbin which is transported while in a vertical position.

FIG. 3 shows a further embodiment of the apparatus according to the invention. In this exemplary embodiment, the bobbin is transported on the conveyor belt in an upright position. In this exemplary embodiment as well, only those features that are necessary for a comprehension of the invention are shown.

A bobbin 301 is disposed upright on a conveyor belt 305 of a transport apparatus 304. The conveyor belt 305 has cams 305a. A bottom 303a of a tube 303 is disposed upright on one of these cams 305a. The conveyor belt 305 is driven by a drive roller 306 through a motor 307. A gear 308 is disposed between the motor 307 and the drive roller 306. The motor 307 is controlled by a computer 318 over a signal line 307a. The rpm of the drive roller 306 and therefore the transport speed of the bobbins is monitored by a sensor 312, which observes a marking 313 provided on a shaft 306a of the drive roller. The signals of the sensor 312 are likewise supplied to the computer 318 over a signal line 312a. As in the first exemplary embodiment, the light transmitters and light receivers are once again switched on and off by a timer 314. The timer 314 and the computer 318 are connected with one another in alternation through signal lines 314a and 318a. In this exemplary embodiment as well, the light transmitters and light receivers face on another at the conveyor belt 305 of the transport apparatus 304 and are vertically disposed one above the other. As compared with the preceding exemplary embodiment, a larger number of light transmitters and light receivers is necessary. Light transmitters 310a–310m are switched on and off in succession at a fixed rhythm, each through a respective signal line 315a–315m thereof. The cycle rate can be specified to the computer 318 at a data input 320. The computer can interact with the timer and thus can monitor the frequency of the timer through the signal lines 318a and 314a. Each time a light transmitter 310a–310m is switched on, a light beam 319a–319m is created which is received by a respective light receiver 311a–311m opposite it. Once again, the light receivers 311a–311m are switched on and off by the timer 314 through corresponding signal lines 316a–316m.

Once the bobbin 301 has reached a measuring station 309, it will break one or more of the beams 319a–319m. In contrast to the preceding exemplary embodiment, this interruption will be effected first by a yarn package 302. As in the preceding exemplary embodiment, shading of the first light receiver is reported to the computer over one of the signal lines indicated as a combined signal line 317. From that instant on, the time that elapses until a time when no further shading of any light receiver occurs is also measured. As in the preceding embodiment, the number of light receivers that are in a shadow per cycle is recorded. The volume of the bobbin can be calculated from the monitored transport speed, the time elapsed between the first and last shading signal and the number of light receivers in shadow per cycle. However, in order to do so, the volume is calculated by a different method from that of the preceding embodiment. This will be explained below in conjunction with FIG. 4.

Figure 4:
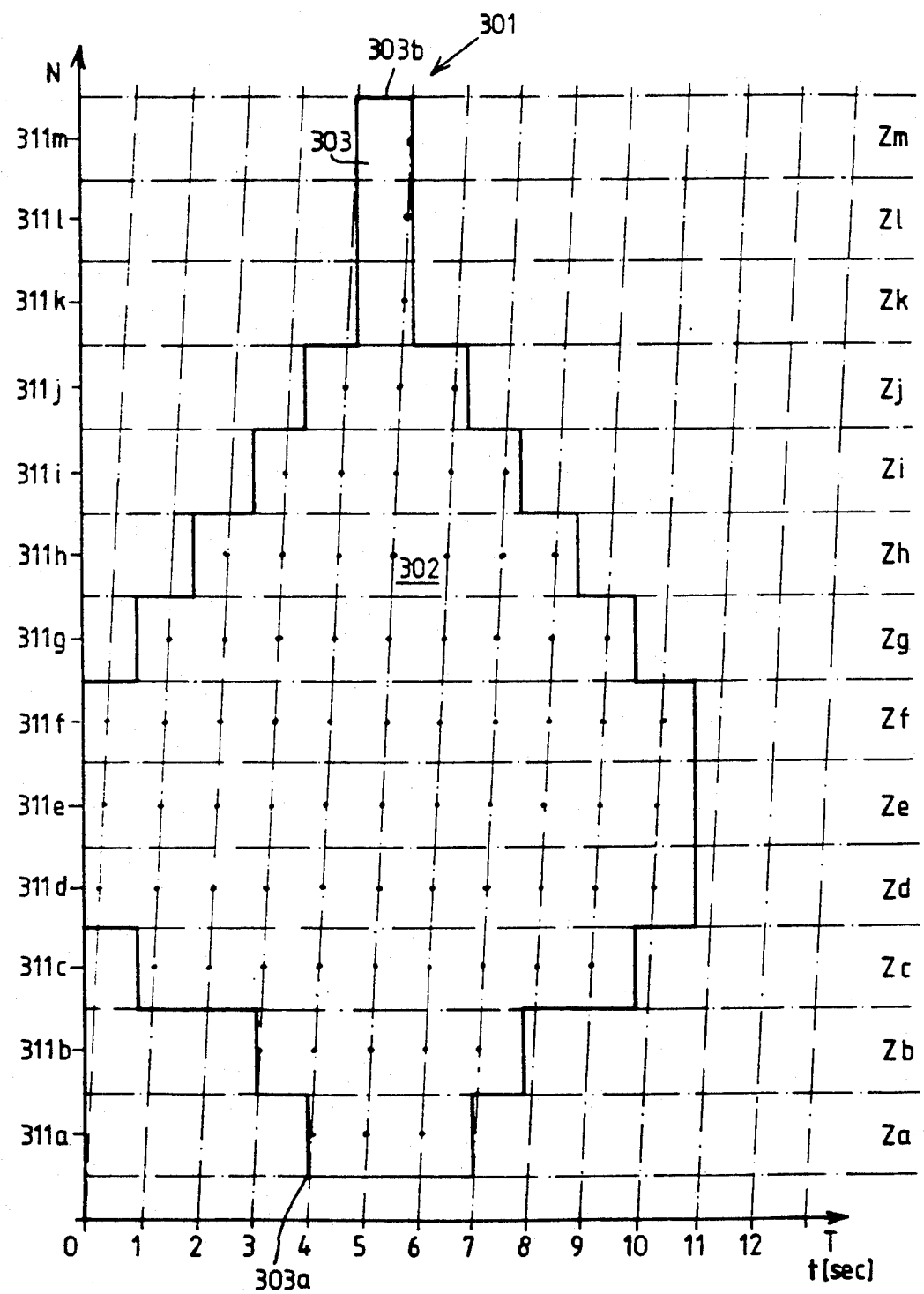
FIG. 4 is a diagram of light receivers that are shadowed by a bobbin that is transported in a vertical position.

During the first cycle, the light receivers 311d–311f are in a shadow. Since the bobbin is upright, the computer cannot calculate any diameter from the signals it receives. For this reason, scanning of the upright bobbin 301 is performed line by line. The shadow signals of each receiver 311a–311b per cycle are added up individually for each light receiver. Each light receiver ticks off a line Za-Zm associated with it. A diameter of the bobbin in a line can be ascertained for each light receiver from the number of cycles per light receiver and the distance traveled by the bobbin during these cycles. Since the spacing of the light receivers is known, the height of the bobbin can also be ascertained, by adding up the spacings. Each light receiver, with the width of its scanned range, includes a certain height of the bobbin. This height is equivalent to the width of one line Z. Since FIG. 4 is intended merely to explain the method according to the invention, it does not represent the actual number of sensors or their spacings. The outline of the bobbin is therefore shown in a generalized, simplified fashion.

During the scanning of a bobbin transported upright past the measuring station, the computer waits to perform the diameter determination until no further shading of a light receiver occurs. Subsequently, it is not possible to determine the diameter of the bobbin in each line until signals have been received from the individual light receivers. Since the line height is known, a cylindrical volume can be calculated for each line. The sum of these volumes gives the total volume of the bobbin. The accuracy is once again dependent on the number of light transmitters and light receivers and on their resolution capacity.

In order to ascertain the dimensions of the bobbin tube 303, the number of cycles in which the light receiver is in a shadow is stored separately in memory by the lowermost light receiver 311a that is in the shadow of the tube bottom 303a, and the uppermost light receiver, in this case 311m, that is in the shadow of a tube top 303b. The light receiver 311a was in a shadow for three cycles, that is the cycles 5, 6 and 7, while the light receiver 311m was only in a shadow during the fifth cycle. The computer ascertains the diameter from this fact. The height of the tube can be calculated from the number of lines located between the lowermost and the uppermost light receiver in a shadow. The tube volume is subsequently calculated by the computer, from the diameters and the height of the tube. The tube volume is subtracted from the total volume of the bobbin, and thus the volume of the yarn package 302 is ascertained.

As in the first exemplary embodiment, the volume of the yarn package 302 is also compared with a predetermined yarn package volume in the exemplary embodiment of FIG. 3. This specified volume can be input to the computer through the data input 320. The tube dimensions can also be input accordingly. From the data being entered, it is possible for the computer to make comparisons between the specified volume of a yarn package and the yarn package volume calculated in each scanning procedure. Subsequently, the computer can assign the bobbins to certain work stations and/or method steps. This is effected through a signal line 321, which leads to non-illustrated means for assigning the bobbins to certain work stations and/or method steps. A tolerance range within which the volumes of the yarn packages of the bobbins being scanned must suit the assignment, can also be specified through the data input or input unit 320.

Figure 5:
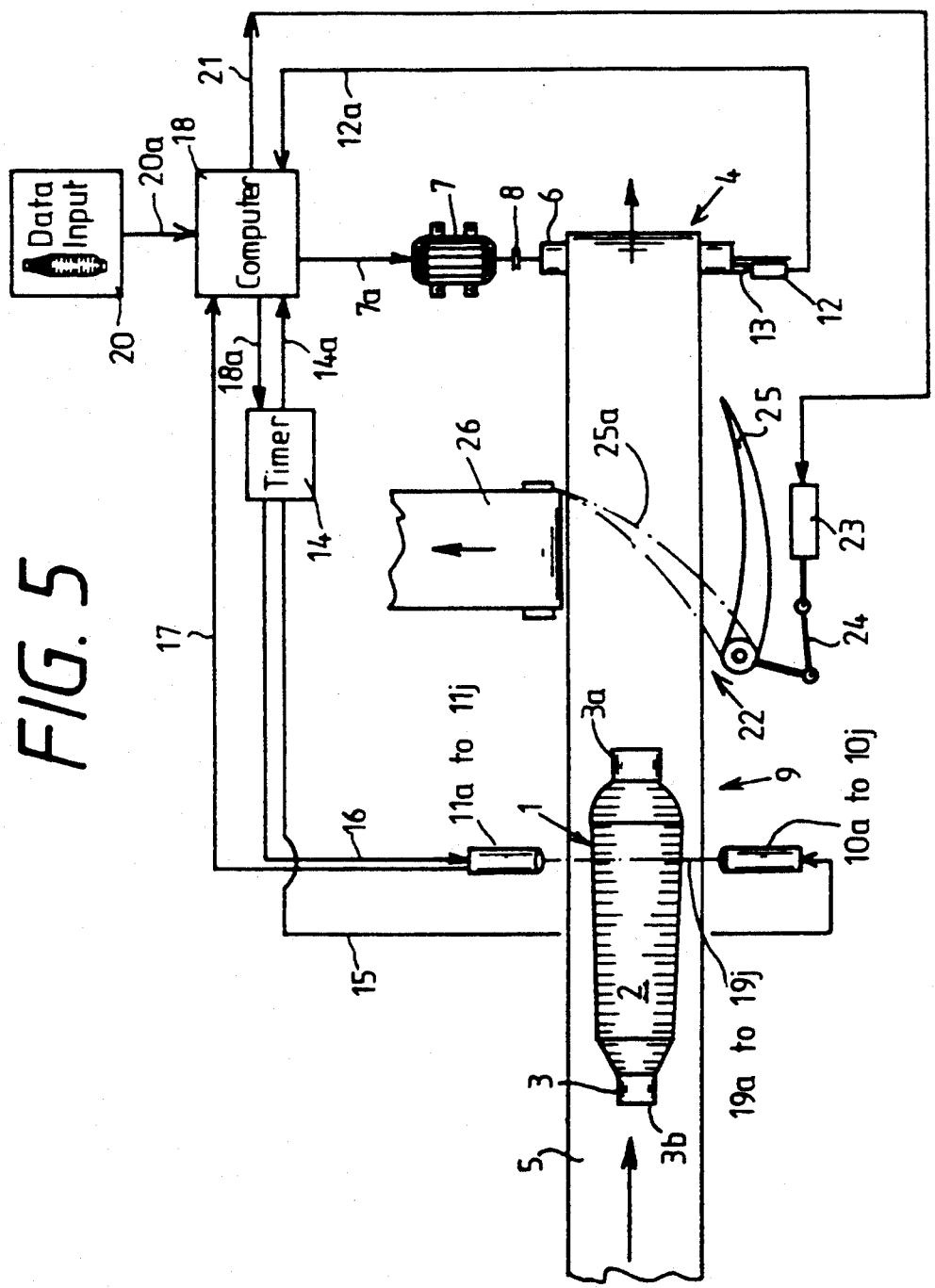
FIG. 5 is a fragmentary, top-plan and schematic view of an apparatus according to the invention as shown in FIG. 1, and a sorting apparatus connected downstream thereof.

FIG. 5 shows an exemplary embodiment in which the apparatus of FIG. 1 is equipped with means for assigning the bobbins to certain work stations and/or method steps. In the present example, this means is a sorting apparatus 22.

The structure of the apparatus of FIG. 5 is equivalent to that of FIG. 1. FIG. 5 merely shows this apparatus from a different perspective, and specifically in a plan view. In this case, the computer 18 communicates with a solenoid 23 over the signal line 21. The solenoid 23 acts through a rod linkage 24 to actuate a shunt 25 that is installed laterally alongside the conveyor belt 5 of the transport apparatus. Opposite the shunt is a chute or a further conveyor belt 26, which is disposed at a right angle relative to the conveyor belt 5. If the shunt is pivoted into a position 25a, the bobbins 1 transported on the conveyor belt 5 from the measuring station 9 are directed onto the conveyor belt 26 which, for instance, may lead to a non-illustrated tube cleaning station.

If the computer has ascertained from the optical scanning of a bobbin 1 at the measuring station 9 that the volume of the yarn package 2 does not meet the given limit values, for instance because the yarn package has too small a volume, it can actuate the shunt 25 through the signal line 21 and move it to the position 25a. As a result, the defective bobbin is rejected. The path onward, for instance to a bobbin winding machine, is opened only for bobbins that are within the tolerance range or above it.

Figure 6:
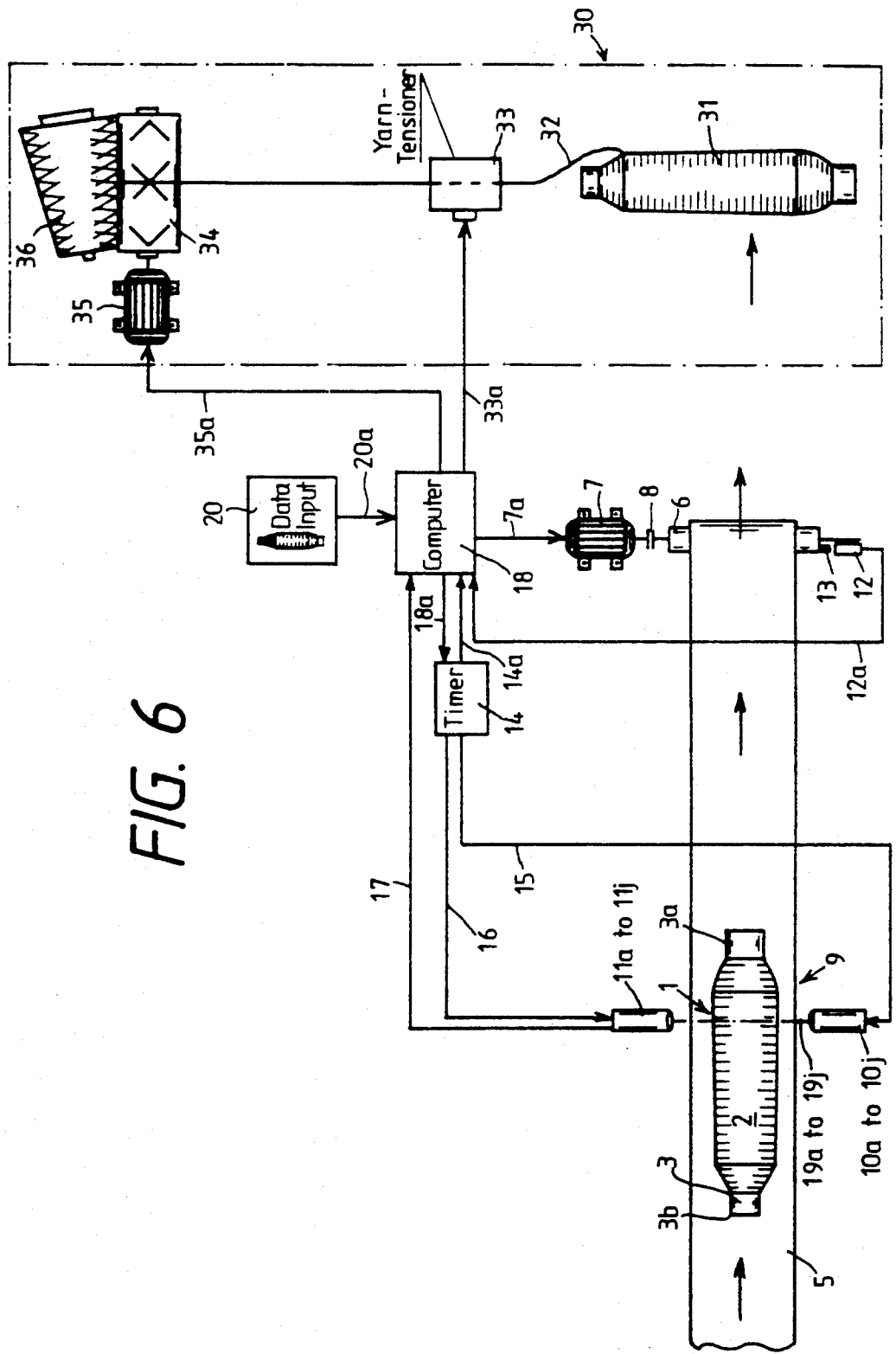
FIG. 6 is a fragmentary, top-plan and schematic view of a control of a yarn tensioner and drive of a winding drum at a winding station.

FIG. 6 shows another plan view of an exemplary embodiment corresponding to FIG. 1, with a winding station of a bobbin winder machine connected downstream thereof.

As is indicated by arrows on the conveyor belt 5, the bobbins 1 being optically scanned at the measuring station 9 are transported to a winding station 30 of a bobbin winder machine, which is not shown in further detail herein. Only those features of the winding station which are relevant to a comprehension of the invention are shown in this case.

A bobbin 31 is in an unwinding position. A yarn 32 travels over a yarn tensioner 33 and a winding drum 34 onto a takeup bobbin 36. The winding drum 34 is driven individually through a drive mechanism 35.

The present apparatus offers the opportunity of checking the volume of the yarn package beforehand on bobbins that are transported to a bobbin winder machine. It is known that when an undersized yarn package is unwound at the winding station at the usual winding speed, the yarn tension increases sharply. The winding speed is therefore reduced in order to avoid interruptions due to yarn breakage, when a yarn remnant or a small yarn quantity on a tube are unwound. If a bobbin having a small-volume yarn package is delivered to a winding station, the computer 18 can adjust the applicable winding speed at the winding station. To this end, the computer 18 specifies the optimal winding speed to the drive 35 of the winding drum 34 over a signal line 35a. At the same time, the computer can adjust the yarn tensioner 33 to an optimal yarn tension over the signal line 33a, in expectation of the specified winding speed.

Figure 7:
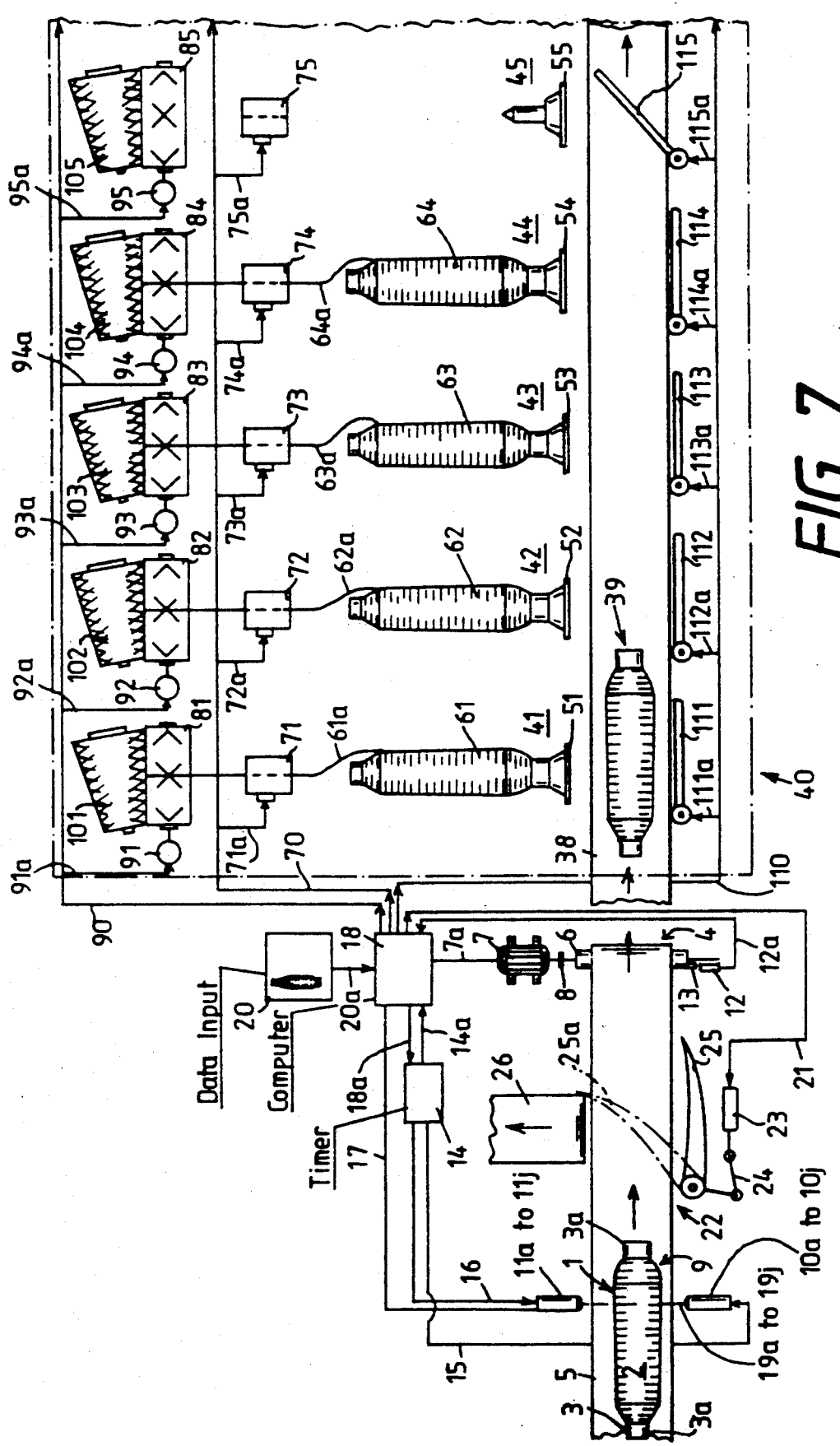
FIG. 7 is a fragmentary, top-plan and schematic view of an apparatus according to the invention as shown in FIG. 1, which is combined with a sorting apparatus and a bobbin winding machine connected downstream thereof.

FIG. 7 shows an apparatus according to the invention for optical scanning of bobbins as in FIG. 1, which is combined with a sorting apparatus and a bobbin winder machine connected downstream of the sorting apparatus. This exemplary embodiment is equivalent to a combination of the exemplary embodiments of FIGS. 5 and 6.

A conveyor belt 38 leads to the bobbin winder machine 40 and carries the bobbins which are presorted in the sorting apparatus 22. In the present exemplary embodiment, the conveyor belt 38 carries a bobbin 39 to the bobbin winder in the direction of the arrow. The conveyor belt 38 moves past winding stations 41, 42, 43, 44, 45 as well as further non-illustrated winding stations of the bobbin winder 40. Only the features of the bobbin winder that are necessary for explaining the invention are shown.

Bobbins 61-64 are in the unwinding position on creel spindles 51-54 at the winding stations 41-44. A creel spindle 55 at the winding station 45 is empty. A tube on the creel spindle 55 which has been unwound until empty, has already been discarded.

Applicable yarns or threads 61a-64a each travel from a respective one of the bobbins 61-64 through a respective yarn tensioner 71-74, while a yarn tension 75 has been opened to receive a yarn. The yarns also travel over applicable winding drums 81-84 onto takeup bobbins 101-104. One completely wound takeup bobbin 105 is ready for removal on the winding drum 85. Each winding drum 81-85 has its own drive mechanism 91-95. Each drive mechanism 91-95 is connected to the computer 18 through a respective signal line 91a-95a and a bus line 90. Each yarn tensioner 71-75 is also connected over a signal line 71a-75a and a bus line 70, which likewise leads to the computer 18.

Shunts 111-115 are each disposed in front of a respective winding station. Each shunt communicates through a signal line 111a-115a with a bus line 110, which again leads to the computer 18. The shunts 111-115 are pivot levers that are disposed laterally alongside the conveyor belt 38. As is shown for the shunt 115, the shunts can be pivoted onto the conveyor belt 38 in such a way that a bobbin transported that far can be directed to the appropriate winding station and placed on the appropriate creel spindle. The way in which this transfer and placement of a bobbin on the creel is to be carried out is not illustrated in detail herein, because it does not contribute to a comprehension of the invention and is also known from the prior art.

In FIG. 7, a bobbin 1 is just being optically scanned at the measuring station 9. Once the computer 18 has calculated the size of the yarn package 2, then the size, that is the volume of the yarn package, is compared with a yarn package volume specified through the data input or input unit 20. If the yarn package is so small that unwinding is no longer worthwhile, the bobbin is rejected at the sorting apparatus 22. To this end, the shunt 25 pivots over the conveyor belt 5 into the position 25a and steers the bobbin that is to be rejected onto the chute 26.

However, it is not only the volume of the yarn package that can be determined by the computer 18 of the measuring station. It is also possible to distinguish between various yarn batches from predetermined yarn volumes and tube dimensions. Accordingly, the computer is not only capable of adjusting the winding speed and the yarn tension at the winding station to which the bobbin having been just scanned is directed, but also of triggering the winding station intended for unwinding the particular yarn batch, on the basis of an ascertained yarn volume.

Once a bobbin has been scanned at the measuring station 9, the computer has not only calculated the volume of the yarn package but has also already recognized the yarn batch. The bobbin is thereupon carried to the appropriate winding station. In the present case, the bobbin 39 is transported to the winding station 45. The shunt 115 has already been triggered by the computer 18 over the signal line 115a and pivoted over the conveyor belt 38. As a result, the bobbin 39 transported there is diverted to the winding station 45 and readied for unwinding on the creel spindle 55. The computer has also already adjusted the yarn tensioner to the optimal yarn tension, over the signal line 75a. The drive 95 of the winding drum 85 is also adjusted to an optimal winding speed over the signal line 95a. This winding speed is oriented to the ascertained volume of the yarn package and to the batch of yarn to be wound.

As has been explained in conjunction with this exemplary embodiment, the optical scanning of the size of a yarn package of a bobbin offers the opportunity of adjusting an optimal winding speed and yarn tension at a winding station, and of rejecting defective bobbins and bobbins having too little yarn remaining on them, on the basis of the ascertained yarn package volume. It is also possible to distinguish various yarn batches and to deliver them to the appropriate winding stations of a bobbin winder machine. It is likewise possible to adapt the yarn tension and winding speed to the yarn batch to be rewound.

We claim:

1. A method for optically scanning a yarn package on a bobbin and determining the size of the yarn package and of the bobbin with a plurality of light transmitters and light receivers and for deriving defined control processes in accordance with the ascertained size, which comprises:

moving bobbins with yarn packages in a given direction of motion at a predetermined speed between a column of a plurality of light transmitters disposed one above the other with respect to the given direction of motion and a column of a plurality of light receivers disposed one above the other with respect to the given direction of motion, each of the light transmitters being associated with a respective one of the oppositely disposed light receivers, for placing at least some of the light receivers into a shadow;

switching at least one of the light transmitters and light receivers on and off in cycles at a predetermined rhythn, order and duration;

delivering a signal to a computer from each of the light receivers placed into a shadow in each cycle by a bobbin;

calculating the volume of the bobbin with the computer from a given time required for scanning one bobbin, from the signals from the shadowed light receivers delivered during the given time, and from the predetermined speed of motion of the bobbins;

subtracting the volume of the tube of the bobbin from the volume of the bobbin for determining the volume of the yarn package;

and assigning the bobbins to a specific work station as a function of the volume of the yarn package.

2. The method according to claim 1, which comprises scanning the bobbins line by line.

3. The method according to claim 1, which comprises subtracting the predetermined volume of the tube from the ascertained volume of the bobbin, for ascertaining the volume of the yarn package.

4. The method according to claim 1, which comprises ascertaining the actual dimensions of the tube of the bobbin from the number of light receivers shadowed by the top end and the number of light receivers shadowed by the bottom end of the tube of the bobbin.

5. The method according to claim 1, which comprises specifying the volume of the yarn package and the dimensions of the tube to the computer as reference values based on a fully wound, defect-free bobbin of one yarn batch, and comparing the volumes of the yarn packages of the bobbins and the dimensions of the tubes with the reference values.

6. The method according to claim 5, which comprises sorting the bobbins in accordance with various yarn batches from the ascertained volumes of the yarn packages and the dimensions of the tubes.

7. The method according to claim 1, which comprises specifying an unwinding speed at an intended winding station of a bobbin winding machine from the ascertained volumes of the yarn packages of the bobbins.

8. The method according to claim 1, which comprises specifying a yarn tension at an intended winding station of a bobbin winding machine from the ascertained volumes of the yarn packages of the bobbins.

9. An apparatus for optically scanning a yarn package on a bobbin and determining the size of the yarn package and of the bobbin and for performing defined control processes derived according to the ascertained size, comprising:

a transport apparatus with a conveyor belt on which bobbins are transported at a predetermined speed, said transport apparatus having a drive for said conveyor belt, and said transport apparatus having a column of a plurality of light transmitters disposed one above the other and a column of a plurality of light receivers disposed one above the other and facing said light transmitters, said columns being disposed opposite one another alongside said conveyor belt and each of said light transmitters being associated with a respective one of said light receivers;

a timer connected to at least one of said light transmitters and light receivers for switching at least one of said light transmitters and light receivers on and off in a predetermined order and for a predetermined duration;

a signal line connected to said timer, a computer connected through said signal line to said timer; other signal lines connected between said light receivers and said computer;

a further signal line through which said computer communicates with said drive of said transport apparatus for specifiying a transport speed;

said computer having means for calculating the volume of the bobbin from a given time required for scanning one bobbin, from signals received through said signal line from said light receivers, and from said specified transport speed;

at least one means for assigning the bobbins to a certain work station, and an additional signal line through which said computer communicates with said assigning means.

10. The apparatus according to claim 9, wherein said at least one performing and assigning means is a sorting apparatus for sorting the bobbins as a function of a specified volume of a yarn package.

11. The apparatus according to claim 9, wherein said at least one performing and assigning means is a sorting apparatus for sorting the bobbins on the basis of a particular yarn batch to which the bobbins belong.

12. The apparatus according to claim 9, wherein said at least one performing and assigning means are shunts for assigning the bobbins to certain winding stations of a bobbin winding machine.

13. The apparatus according to claim 9, wherein said at least one performing and assigning means is a yarn tensioner for controlling yarn tension.

14. The apparatus according to claim 9, wherein said at least one performing and assigning means is controllable drive of a winding drum at a winding station.

15. An apparatus for optically scanning a yarn package on a bobbin and determining the size of the yarn package and of the bobbin and for performing defined control processes derived according to the ascertained size, comprising:

a transport apparatus with a conveyor belt on which bobbins are transported at a predetermined speed, said transport apparatus having a drive for said conveyor belt, and said transport apparatus having a group of light transmitters and a group of light receivers disposed one above the other and opposite one another in pairs on opposite sides of said conveyor belt;

a timer connected to at least one of said groups of light transmitters and light receivers for switching at least one of said groups of light transmitters and light receivers on and off in a predetermined order and for a predetermined duration;

a computer connected to said timer, connected to said light receivers and connected to said drive of said transport apparatus for specifying a transport speed;

said computer having means for calculating the volume of the bobbin from a given time required for scanning one bobbin, from signals received through said signal line from said light receivers, and from said specified transport speed; and at least one means connected to said computer for assigning the bobbins to a certain work station.

* * * * *